United States Patent [19]

Toyoda et al.

[11] 3,879,172

[45] Apr. 22, 1975

[54] SULFONATION DEVICE CAPABLE OF FORMING UNIFORM FILM OF FEED MATERIAL

[75] Inventors: Sadao Toyoda; Toshiaki Ogoshi, both of Funabashi; Minoru Maruyama, Soka, all of Japan

[73] Assignee: Lion Fat & Oil Co., Ltd., Tokyo, Japan

[22] Filed: Sept. 11, 1972

[21] Appl. No.: 287,662

[30] Foreign Application Priority Data

Sept. 18, 1971 Japan.............................. 46-72829

[52] U.S. Cl. ...................... 23/284; 23/283; 23/285; 261/112; 261/153
[51] Int. Cl. .......................... B01j 1/00; C07b 13/06
[58] Field of Search .......... 23/283, 284, 285; 159/7, 159/13 A, 13 R; 239/590.3; 261/112, 153; 423/532

[56] References Cited
UNITED STATES PATENTS

| | | | |
|---|---|---|---|
| 2,376,341 | 5/1945 | Burk et al. ........................... | 261/112 |
| 3,482,947 | 12/1969 | Jacobsen et al. .................... | 261/112 |
| 3,620,684 | 11/1971 | Brooks................................. | 23/285 |
| 3,677,714 | 7/1972 | Ledgett.............................. | 23/283 X |

OTHER PUBLICATIONS
Perry's Chemical Engineering Handbook, 4th Edition, pp. 19-59.

*Primary Examiner*—Joseph Scovronek
*Assistant Examiner*—Michael S. Marcus
*Attorney, Agent, or Firm*—Woodhams, Blanchard and Flynn

[57] ABSTRACT

A sulfonation device capable of forming a uniform film of feed material by virtue of a net provided for the opening for feeding the material to be sulfonated to the reaction surface.

11 Claims, 3 Drawing Figures

SULFONATION DEVICE CAPABLE OF FORMING UNIFORM FILM OF FEED MATERIAL

BACKGROUND OF THE INVENTION

1. Field of the Invention

The present invention relates to a sulfonation device for forming a uniform film of feed material to be sulfonated. To be precise, it relates to a sulfonation device which has a net provided for the opening through which the organic feed material is supplied the reaction wall surface.

The term 'sulfonation' according to the present invention means the so-called sulfonation as well as sulfation.

2. Description of the Prior Art

The reaction speed in sulfonation of organic compounds is usually so high that the greater part of the sulfonation is accomplished during the initial stage of the reaction. Besides, the sulfonation reaction is an extraordinary exothermic reaction, and even a partially imperfect elimation of the heat of reaction would entail a secondary reaction to bring about undesirable effects such as the coloring of the products, etc.

The method of sulfonation varies with the properties and constitution of the organic compounds to be subjected to sulfonation and the kind of the desired products, but the method of sulfonation by sulfur trioxide is one of the most typical methods. Sulfur trioxide ($SO_3$) is theoretically capable of completing the addition reaction rapidly and quantitatively, and is therefore generally utilized as a very effective sulfonating agent. In this context, inasmuch as the direct application of $SO_3$ is attended with generation of a furious heat and various secondary reactions, the procedure utilizing $SO_3$ diluted with air or an inert gas has so far been popular. In this case, however, the product is inevitably colored, rendered a final process of bleaching the reaction product indispensable.

In the sulfonation reaction of organic compounds as stated above, the conditions for the reaction, namely, the quantitative ratio of the organic compound to $SO_3$ and the temperature, must be uniform with respect to all points at equal distances from the place of feeding the $SO_3$-inert gas mixture, and accordingly, uniform distribution of the film of the feed material has much influence on the quality of the resulting product. From this point of view, various studies have heretofore been conducted on how to secure uniform distribution of the feed material, and there have been proposed such processes as effecting the uniform distribution by means of a slit, or effecting it by virtue of centrifugal force. However, the process employing a slit has various defects such as follows. As the slit has a width in the range of 0.1 to 0.5 mm or thereabout, it machining as well as adjustment is very difficult. For instance, a difference in the width of said slit by 0.01 mm results in an error of about 11 percent in the volume of feed. Besides, even a slight crack in the slit may have influence on the volume of feed, and a change in the viscosity of the organic compound renders the adjustment of said volume further difficult. Especially, this process is hard to apply to a large-scale apparatus. As for the process resorting to centrifugal force, it is also defective in that, though it is capable of effecting a relatively uniform distribution as far as a cylindrical inner wall surface is concerned, it is inapplicable to wall surfaces of other shapes. Besides, it is hard to apply to a large-scale apparatus.

Furthermore, in case of forming a film of organic compound through the foregoing process employing the slit in particular, the occurrence of disorder on the surface of film ascribable to a temporary peak resulting from (1) the rapid change in the direction of the flow of feed material, (2) the rapid expansion of the sectional area, (3) the rapid decrease of the pressure, etc. immediately after the feeding of material will accelerate the generation of mist within the gas and deteriorate the properties of the reaction product. Therefore, application of this process is absolutely undesirable.

As a means of overcoming these troubles in the prior art, the inventors of the present invention have previously proposed an apparatus devised to form the film of organic compound on the reaction wall-surface through a porous plate. However, even in the case of this apparatus, such questions as the difficulty in obtaining a porous plate with pores having uniform diameter and the insufficiency in minimization of the pressure loss at the time of feeding the organic compound remain undiscussed.

SUMMARY OF THE INVENTION

The first object of the present invention is to provide a device capable of forming a uniform film of feed material.

The second object of the present invention is to provide a device capable of minimizing the coloring, by-product, etc. and producing an excellent end product.

The third object of the present invention is to provide a device capable of decreasing the generation of mist within the waste gas.

The fourth object of the present invention is to provide a device which, makes unnecessary a bleaching process as an aftertreatment and which efficiently produces the end product.

The inventors of the present invention have probed the cause of generation of the colored matters, by-products, etc. in sulfonation reactions using $SO_3$ in the gas-liquid contact process, and have come to the finding that said generation of colored matters, by-products, etc, can be minimized by forming a uniform film of feed material. The present invention has been accomplished on the basis of this finding.

The present invention is intended to provide a device for the purpose of sulfonating such feed material as alkyl aryl hydrocarbon, olefin hydrocarbon, aliphatic alcohol, alkyl phenol, fatty acid as well as their ethoxylate, and other organic compounds capable of sulfonation by the use of $SO_3$.

In other words, the present invention provides a sulfonation device comprising at least one reaction surface along which a feed material to be sulfonated can flow down in the form of a film, an opening for feeding a diluted $SO_3$ gas, an opening for feeding the feed material to be sulfonated to said reaction surface, a means for cooling said reaction surface and an outlet for discharging the reaction product mixture, wherein said opening for feeding the feed material is covered with a net or a layer of nets.

To be more precise, the present invention relates to a sulfonation device provided with a net or nets disposed on the opening for feeding the feed material to be sulfonated, the meshes of said net being in the range of about 5 to 90$\mu$ on the average — preferably in the range of about 10 to 50μ. When the meshes of the net are smaller than 5μ on the average, the pressure loss becomes great, while when the meshes of the net are larger than 90μ on the average, the formation of a uniform film of the feed material becomes infeasible. However, even in the case of the meshes of the net being larger than, say, 90μ, application of several nets, one over another, may achieve the same effect as in the case of application of a single net having the meshes in the range of 5 to 90μ.

As the applicable material for said net according to the present invention, any material will do as long as it is inactive against the organic compound employed as the feed material to the sulfonated. For example, metallic materials such as stainless steel wire, iron wire, brass wire, titanium wire, aluminum wire, etc., inorganic materials such as glass, asbestos, etc., high-molecular organic materials such as polyester, polyamide, etc., as well as mixtures of these materials can be employed for this purpose. The net according to the present invention is prepared by weaving the fibers consisting of these materials into a net. As to the manner of weaving said net, it is desirable to apply the following ways, namely, plain weave, twilled weave, herringbone twilled weave, dutch weave, twilled dutch weave, stranded twilled weave, diamond type weave, flat-top screen weave, wedge wire screen weave, double warp weave and hexagonal type weave. In this connection, two kinds or more of nets may be employed by simply placing one over another or by biasing them.

The present invention relates to a sulfonation device provided with the above described net as disposed on the opening for feeding the organic compound. The device under the present invention is so designed as to make the organic compound ooze out through the fine openings of the net to be uniformly distributed onto the reaction wall-surface, thereby forming a smooth film having uniform thickness. As a result, the properties of the reaction product are improved, and the generation of mist is minimized.

Hereunder will be given full particulars of the present invention by reference to the appended drawings.

BRIEF DESCRIPTION OF THE DRAWINGS

The appended drawings illustrate one embodiment of the present invention.

Figure 1:
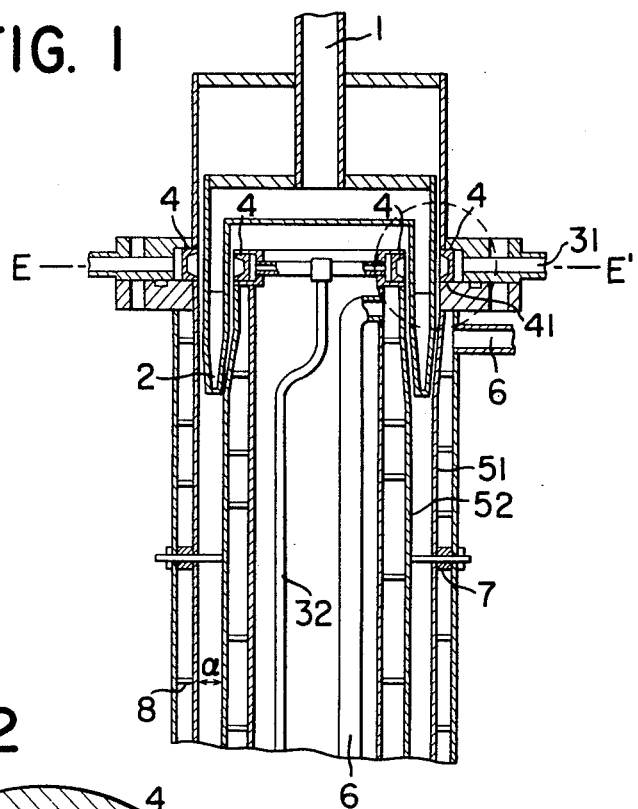
FIG. 1 is a verticle sectional view of the sulfonation device.

In these drawings, the reference numeral 1 denotes an inlet for an $SO_3$-inert gas mixture, 2 denotes an opening for feeding the $SO_{43}$-inert gas mixture into the reaction zone, 31 and 32 denote feeding openings for the organic reactant, 33 denotes a chamber, 4 denotes a frame for supporting the net, 41 denotes a packing, 42 denotes a net, 43 denotes a reinforcement plate, 44 denotes a passage for the organic reactant, 51 denotes an outer reaction surface, 52 denotes an inner reaction surface, 6 denotes an outlet for discharging cooling water, 7 denotes a distance (a) adjusting means, and 8 denotes a diaphragm.

Figure 2:
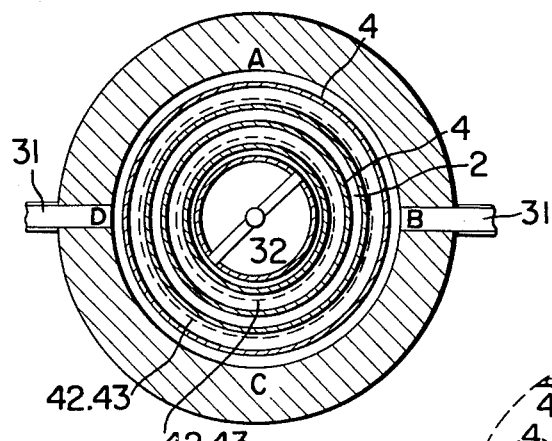
FIG. 2 is a sectional view taken along the line E—E' in FIG. 1.
Figure 3:
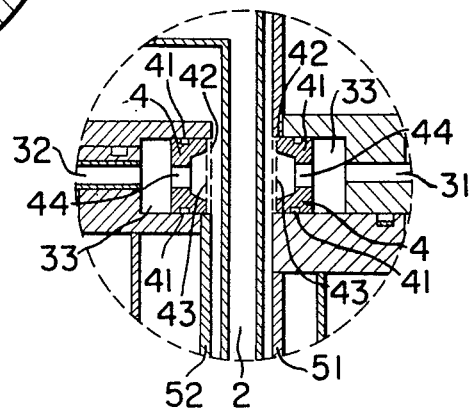
FIG. 3 is a view — on an enlarged scale — of the fragment encircled by the dotted line in FIG. 1.

The reaction device according to the present invention consists of, for example, a couple of annular reaction surfaces of a concentric double cylinder, a means for uniform distribution of $SO_3$ disposed between said reaction surfaces, a means for uniform distribution of the feed material, namely, a liquid organic compound and a diluted $SO_3$ gas ($SO_3$-inert gas mixture), and a jacket for cooling the reaction surfaces. Referring to FIGS. 1 to 3, the $SO_3$-inert gas mixture is introduced into the device through the inlet 1 provided on the upper part of the device, and is subsequently sent in the reaction zone through $SO_3$-feeding opening 2. The organic compound as the feed material to be sulfonated is introduced into the device through openings 31 32 for feeding the feed material at a mass velocity of about 0.4 to 4 $Kg/cm^2 \cdot hr$ and is made to ooze out onto reaction surfaces 51 52 within the reaction zone through a net 42 to be formed into a film on said surfaces. In this connection, the net 42 is supported by frame 4 having a passage 44 for the feed material, and is sealed by means of packing 41 so as not to come off easily. Further, the net is reinforced by means of reinforcement plate 43 such as a punched plate, as occasion demands. Meanwhile, cooling water is led into an opening for cooling water (which is not shown in the appended drawings) equipped on the lower part of the reaction device, and is discharged to the outside through the outlet for cooling water 6. In this context, the cooling water for use in cooling an outer reaction surface 51 and the cooling water for use in cooling an inner reaction surface 52 are separately led in and discharged from the device. In this way, the sulfonation reaction between $So_3$ and the organic compound is effected through gas-liquid contact within the reaction zone. Subsequently, the reaction product mixture is recovered through the outlet (which is not shown in the appended drawings) equipped on the lower end of the reaction device, is transferred to the next process of gas-liquid separation by means of a cyclone, and the thus separated liquid is further subjected to neutralization or neutralization hydrolysis to be made into a product. According to the present invention, by virtue of application of the net 42, distribution of the reaction liquid to the reaction surfaces 51 52 is performed very satisfactorily. In this context, the width (vertical direction) of said net is influenced by the size of the reaction device to some degree, but it is in the range of about 5 to 50 mm — preferably in the range of about 5 to 20 mm. The distance (a) between the inner and outer reaction surfaces 51 52 can be adjusted at will by means of the distance adjusting means 7. Besides, diaphragms 8, as to the cooling system, are usually provided here and there inside said jacket.

FIG. 2 is a sectional view of a portion of the material feeding means 33 as provided with the net 42. In this context, said material feeding means is not necessarily required to be so devised as to divide the course of distributing the organic compound from the material feeding opening 32 to the net 42 into two directions: what is essential is to see that the organic compound be uniformly distributed. On this occasion, the circular interval between the adjoining distribution pipes branching off the material feeding opening 32 is usually less than about 700 mm — preferably less than about 300 mm.

The device under the present invention is not only suitable for use in effecting the foregoing type of sulfonation reaction, i.e., gas-liquid reaction, but also well applicable to liquid-liquid reaction. The present device employing the above described net renders it possible to realize all those effects aimed at by the previously proposed apparatus employing the porous plate. Moreover, application of the present net provides very uniform fine openings, thereby making it possible to effect uniform distribution of the material more satisfactorily, to form a uniform film of the material, and to decrease the pressure loss very much. As to the preparation of the present device, it will do to construct a simple frame, and accordingly, it can be easily utilized for a large-scale apparatus. Further, it has such a merit that the material for use in its construction is subject to little restriction and is easy to obtain.

As stated above, the sulfonation device under the present invention is applicable to whatever shaped reaction wall-surface, for instance, the wall-surface of a flat board type reaction apparatus, not to speak of the cylindrical wall-surface. The effect of the present invention is therefore important. For example, the present device can be utilized for a large-scale apparatus, and can be also applicable to an apparatus having more than two reaction wall-surfaces as well as plural apparatuses as combined in a row. Especially, the present device is very simple in construction, and requires no adjustment at all. Accordingly, compared with the conventional devices attended with an extreme difficulty in adjustment of the slit at the time of supplying organic compounds of various viscosity to the reaction wall-surface, the present device can easily deal with such compounds by simple changing the net with another one having different meshes.

Furthermore, the sulfonation reaction by means of the present device is performed quite appropriately inasmuch as the organic compound is made to ooze out through the net and is formed into a uniform film. As a result, the generation of undesirable secondary reactions, colored matters and so on is controlled and excellent products can be obtained. Besides, inasmuch as the reaction of the surface of the film of feed material is adjusted, generation of the mist decreases and the reaction is effected efficiently, whereby not only the yield increases but also the quantity of the sulfonating agent to be applied suffices to be less than that for conventional devices and the mist within the waste gas is lessened. Such being the case, the industrial value of the present device is significant.

DESCRIPTION OF THE PREFERRED EMBODIMENTS

EXAMPLE 1.

Liquid distribution tests was conducted with respect to a sulfonation reaction device (having an inner wall-surface of 96 mm in diameter and 150 cm in length) as provided with a net set on the opening for supplying the test liquid (that is, the material to be sulfonated) to the reaction wall-surface. As for the test conditions, the test liquid was a straight-chain alkyl benzene having a specific gravity of 0.855 (mean molecular weight: 243), the temperature was 25°C, the feed rate was 250 Kg/m.hr, and the net (10.0 mm width) was a stainless steel net (SuS 27) having the prescribed meshes.

The result of the test was as shown in Table-1 below. As is verified by comparison with the comparative example, the present device can form an extremely uniform film of the liquid and also remarkably reduces the pressure loss at the time of feeding the test liquid. In this connection, the notations A through D in the table indicate portions of 10 mm length located 5 cm below the positions corresponding to A through D shown in FIG. 2.

Table 1

| Pattern of distribution device | | Comparative Example | | Present Example | | | |
|---|---|---|---|---|---|---|---|
| | | slit (0.3 mm) | porous plate (mean bore: 70μ) | meshes of net (on the average) | | | |
| | | | | 13μ | 18μ | 33μ | 44μ |
| ΔP | (Kg/cm²) | 0.25 | 0.20 | 0.07 | 0.04 | 0.02 | less than 0.01 |
| A | Kg/m.hr | 238 | 244 | 255 | 246 | 245 | 250 |
| A~B | do. | 312 | 257 | 248 | 255 | 257 | 260 |
| B | do. | 250 | 244 | 246 | 251 | 252 | 253 |
| B~C | do. | 100 | 244 | 245 | 248 | 246 | 242 |
| C | do. | 250 | 251 | 250 | 253 | 256 | 248 |
| C~D | do. | 388 | 263 | 253 | 246 | 253 | 256 |
| D | do. | 250 | 251 | 250 | 245 | 250 | 248 |
| D~A | do. | 125 | 244 | 253 | 251 | 245 | 250 |
| maximum error (against the feed rate) % | | 40 | 5.2 | 2.0 | 2.0 | 2.8 | 4.0 |

(Remark) ΔP: pressure loss

EXAMPLE 2.

Test was conducted by employing the same device as in Example 1 and olefin having carbon atoms in the range of 16 to 18 and under the same conditions as in Example 1 except for application of one net having the meshes of 18μ and a layer of five nets having the meshes of 108μ each.

The results of the tests were shown in Table-2 below. As is evident from this showing, even in case of a net having large meshes, the same effect as in Example 1 may be obtained through application of a layer of appropriate number of such nets.

Table 2

| Pattern of distribution device | | Single net having meshes of 18μ | Layer of 5 nets having meshes of 108μ each |
|---|---|---|---|
| ΔP | (Kg/cm²) | 0.04 | 0.02 |
| A | Kg/m.hr | 247 | 248 |
| A~B | do. | 255 | 258 |

Table 2-Continued

| Pattern of distribution device | | Single net having meshes of 18μ | Layer of 5 nets having meshes of 108μ each |
|---|---|---|---|
| B | do. | 251 | 246 |
| B ~C | do. | 249 | 244 |
| C | do. | 252 | 255 |
| C~D | do. | 246 | 255 |
| D | do. | 254 | 252 |
| D~A | do. | 250 | 242 |
| maximum error (against the feed rate) % | | 2.0 | 3.2 |

EXAMPLE 3.

Sulfonation reaction of α-olefin ($C_{16}$) obtained through ethylene polymerization process was effected under the condition that the length of the reactor was 2 m, the gap between the inner and outer reaction surfaces was 5.5 mm, the diameter of the outer reaction surface was 108 mm, the width of the net was 10.0 mm, the feed rate of the organic material was 140 Kg/hr, the molar ratio of $SO_3$ to α-olefin was 1.15, the feed rate of air was 6 $Nm^3/min$, and the temperature of the cooling water was 25°C. According to the device employing the net under the present invention, the unreacted oil content decreased, the yield increased, the by-product decreased, and the degree of coloring of the product was low.

Table 3

| | Comparative Example | | Present Example | | | |
|---|---|---|---|---|---|---|
| | slit (0.3 mm) | porous plate (mean bore 70μ) | meshes of net (on the average) | | | |
| | | | 13μ | 18μ | 44μ | 108μ* |
| unreacted oil content (against active salt) (wt%) according to petroleum ether extraction process | 2.91 | 2.54 | 2.47 | 2.50 | 2.52 | 2.54 |
| degree of coloring (5% concentration) absorbancy: 10 mm cell, 240 mμ | 0.125 | 0.100 | 0.090 | 0.085 | 0.095 | 0.090 |
| disulfonate (against active salt) (wt%) | 8.5 | 7.4 | 7.0 | 6.8 | 7.4 | 7.4 |

(Remark)
*A layer of nets having the meshes of 108μ each was applied.

What is claimed is:

1. An apparatus for continuously reacting a reactant liquid with reactant fluid, in which a film of the reacting liquid is continuously flowed downwardly along elongated reaction surface means in contact with concurrently flowing reactant fluid, comprising;

a reactor comprising two concentric, vertically extending walls which are radially spaced from each other to define an annular reaction zone with the opposing surfaces of said walls defining two opposing reaction surfaces; an annular nozzle disposed between said surfaces for feeding said reactant fluid to the upper end of said reaction zone; feeding means for feeding said liquid to the upper end of said reaction zone, said feeding means being separate from said nozzle, said feeding means comprising means mounted on said reactor and defining a chamber for containing said liquid, said chamber being open along one side thereof adjacent to the upper end of one of said reaction surfaces, woven net means extending completely across the open side of said chamber and having uniformly arranged small openings therethrough, said openings having an effective size of 5 to 90 μ, whereby the liquid passes from the chamber through said openings and flows onto the upper portion of one of said reaction surfaces and moves downwardly thereon as a thin film of substantially uniform thickness.

2. An apparatus according to claim 1, in which said net means consists of a single net layer having openings of a size in the range of 5 to 90μ.

3. An apparatus according to claim 1, in which said net means consists of a plurality of superposed net layers having openings of sizes such that they provide an effective flow corresponding to the flow through a single net layer having openings of a size in the range of 5 to 90μ.

4. An apparatus according to claim 1, in which said means defining said chamber comprises a casing mounted on the upper end of said reactor and having a conduit extending laterally outwardly from said chamber on the opposite side thereof from said one side thereof, a frame removably disposed in said chamber and sealingly contacting the wall of said chamber, said frame member being substantially channel-shaped and having an opening through the base wall thereof, the legs of said frame member projecting toward said one side of said chamber and said net means being disposed across the open side of said frame member.

5. An apparatus according to claim 1, wherein said net is made of filaments of stainless steel, iron, brass, titanium, aluminum, glass, asbestos, polyester, or polyamide or combinations of said filaments.

6. An apparatus according to claim 1, in which said chamber is disposed sidewardly from the upper end of one of said reaction surfaces, and said net means extends substantially vertically from the upper end of said one reaction surface and constitutes a vertical extension thereof, said net means having a vertical dimension in the range of 5 to 50 mm.

7. An apparatus according to claim 6, in which said net means consists of a single net layer having openings of a size in the range of 5 to 90μ.

8. An apparatus according to claim 6, in which said net means consists of a plurality of superposed net layers having openings of size such that they provide an effective flow corresponding to the flow through a single net layer having openings of a size in the range of 5 to 90μ.

9. An apparatus according to claim 5, in which said feeding means comprising means at the upper end of both of said walls and defining a pair of said chambers, both of said chambers, having net means extending across the open sides thereof.

10. An apparatus according to claim 9, in which said annular nozzle is an upright elongated stationary nozzle having an opening at its lower end, said nozzle extending substantially parallel to said reaction surfaces from a location spaced vertically downwardly from said feeding means whereby said reactant fluid is fed onto said reaction surfaces at a location below that at which the reactant liquid forms a uniform film on said reaction surfaces.

11. An apparatus according to claim 9, in which the upper end portions of said walls below said chambers are inclined toward each other to define a progressively narrowing section of said annular zone, said section extending for a portion of the length of the reactor and the remainder of said zone being of constant thickness, said annular nozzle extending downwardly in said annular zone and terminating at a position adjacent the lower end of said section and having an opening at the lower end thereof for feeding said reactant fluid into the annular reaction zone thereat.

* * * * *